United States Patent
Wright

(10) Patent No.: US 9,862,819 B2
(45) Date of Patent: Jan. 9, 2018

(54) COMPOSITION FOR SOFT SKINS AND USES THEREOF

(71) Applicant: KRATON POLYMERS U.S. LLC, Houston, TX (US)

(72) Inventor: Kathryn J. Wright, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 31 days.

(21) Appl. No.: 15/175,396

(22) Filed: Jun. 7, 2016

(65) Prior Publication Data

US 2016/0362544 A1    Dec. 15, 2016

Related U.S. Application Data

(60) Provisional application No. 62/174,871, filed on Jun. 12, 2015.

(51) Int. Cl.

| | |
|---|---|
| *C08L 53/02* | (2006.01) |
| *C08L 53/00* | (2006.01) |
| *B05D 5/00* | (2006.01) |
| *B29C 43/00* | (2006.01) |
| *B29C 43/24* | (2006.01) |
| *B29C 45/00* | (2006.01) |
| *B29C 47/00* | (2006.01) |
| *C08J 5/00* | (2006.01) |
| *C08L 75/08* | (2006.01) |
| *D06M 15/227* | (2006.01) |
| *D06M 15/233* | (2006.01) |
| *D06M 15/564* | (2006.01) |
| *C09D 153/02* | (2006.01) |
| *B29C 41/00* | (2006.01) |
| *B29C 41/04* | (2006.01) |
| *B29C 41/18* | (2006.01) |
| *B29C 51/00* | (2006.01) |
| *B29K 23/00* | (2006.01) |
| *B29K 25/00* | (2006.01) |
| *B29K 55/00* | (2006.01) |
| *B29K 75/00* | (2006.01) |
| *B29K 105/00* | (2006.01) |

(52) U.S. Cl.
CPC .............. *C08L 53/005* (2013.01); *B05D 5/00* (2013.01); *B29C 43/003* (2013.01); *B29C 43/24* (2013.01); *B29C 45/0001* (2013.01); *B29C 47/0004* (2013.01); *C08J 5/00* (2013.01); *C08L 53/025* (2013.01); *C08L 75/08* (2013.01); *C09D 153/025* (2013.01); *D06M 15/227* (2013.01); *D06M 15/233* (2013.01); *D06M 15/564* (2013.01); *B29C 41/003* (2013.01); *B29C 41/04* (2013.01); *B29C 41/18* (2013.01); *B29C 47/0009* (2013.01); *B29C 51/002* (2013.01); *B29K 2023/065* (2013.01); *B29K 2023/0633* (2013.01); *B29K 2025/08* (2013.01); *B29K 2055/00* (2013.01); *B29K 2075/00* (2013.01); *B29K 2105/0067* (2013.01); *B29K 2105/0085* (2013.01); *B29K 2105/0094* (2013.01); *B29K 2995/007* (2013.01); *B29K 2995/0046* (2013.01); *B29K 2995/0077* (2013.01); *C08J 2353/00* (2013.01); *C08J 2375/08* (2013.01); *C08J 2409/00* (2013.01); *C08J 2409/06* (2013.01); *C08J 2423/06* (2013.01); *C08L 2205/03* (2013.01); *C08L 2205/035* (2013.01); *C08L 2207/062* (2013.01); *C08L 2207/066* (2013.01); *D06M 2200/11* (2013.01); *D10B 2505/12* (2013.01)

(58) Field of Classification Search
CPC .. C08L 53/025; C08L 53/005; C09D 153/025
See application file for complete search history.

(56) References Cited

U.S. PATENT DOCUMENTS

| | | |
|---|---|---|
| 3,494,942 A | 2/1970 | Takuichi et al. |
| RE27,145 E | 6/1971 | Jones |
| 3,595,942 A | 7/1971 | Wald et al. |
| 3,634,549 A | 1/1972 | Shaw |
| 3,670,054 A | 6/1972 | De La Mare et al. |
| 3,686,366 A | 8/1972 | Winkler |
| 3,700,633 A | 10/1972 | Wald et al. |
| 3,700,748 A | 10/1972 | Winkler |
| 3,985,830 A | 10/1976 | Fetters et al. |
| 4,039,593 A | 8/1977 | Kamienski et al. |

(Continued)

FOREIGN PATENT DOCUMENTS

| | | |
|---|---|---|
| CA | 716645 A | 8/1965 |
| EP | 1474458 B1 | 10/2007 |

(Continued)

OTHER PUBLICATIONS

International Search Report for PCT/US2016/036173, filed Jun. 7, 2016.

(Continued)

*Primary Examiner* — Jeffrey Mullis
(74) *Attorney, Agent, or Firm* — Ekatherina Serysheva

(57) ABSTRACT

A composition is disclosed, comprising a block copolymer, at least one homopolymer or copolymer of butene, and at least one olefin homopolymer or copolymer, wherein said block copolymer has hydrogenated low-vinyl polybutadiene end blocks with a specific gravity>0.85 g/cc, and a controlled distribution midblock of polyalkenyl arene/hydrogenated diene. Although the block copolymer has a preferred linear structure as a triblock copolymer, it may also be branched or radial coupled copolymer that has at least 2 arms or more. The composition is useful for rotational molding, slush molding, injection molding, extrusion or compression molding, or thermoforming or calendering for making articles that are resistant to chemicals such as diesel fuel, for the automotive market, for example. The MFR of the block copolymer is 1 to about 50 g/10 min. at 230° C., with a wt. of 2.16 kg.

19 Claims, No Drawings

(56) References Cited

U.S. PATENT DOCUMENTS

| | | | |
|---|---|---|---|
| 4,391,949 A | 7/1983 | St. Clair | |
| 4,444,953 A | 4/1984 | St. Clair | |
| 5,194,535 A | 3/1993 | Koppes et al. | |
| 5,371,144 A | 12/1994 | Brosius et al. | |
| 5,460,739 A | 10/1995 | Rhodes et al. | |
| 6,034,042 A | 3/2000 | Rhodes | |
| 6,492,469 B2 | 12/2002 | Willis et al. | |
| 7,169,848 B2 | 1/2007 | Bening et al. | |
| 7,704,676 B2 | 4/2010 | Dubois | |
| 2008/0319116 A1 | 12/2008 | Fredrickson et al. | |
| 2009/0062457 A1 | 3/2009 | Handlin, Jr. et al. | |
| 2010/0056721 A1 | 3/2010 | Wright et al. | |
| 2012/0070665 A1 | 3/2012 | Bellomo et al. | |

FOREIGN PATENT DOCUMENTS

| | | |
|---|---|---|
| WO | 9503447 A1 | 2/1995 |
| WO | 2009050606 A1 | 4/2009 |

OTHER PUBLICATIONS

Taiwan Search Report dated Dec. 11, 2016 for TW1-5118022, filed Jun. 7, 2016.
Bovey, F.A., High Resolution NMR of Macromolecules (Academic Press, New York and London, 1972), Ch. 6.

COMPOSITION FOR SOFT SKINS AND USES THEREOF

CROSS-REFERENCE TO RELATED APPLICATION

This application claims the benefit of U.S. Provisional Application No. 62/174,871, filed Jun. 12, 2015.

STATEMENT REGARDING FEDERALLY SPONSORED RESEARCH OR DEVELOPMENT

None.

FIELD OF THE INVENTION

The present disclosure provides a block copolymer composition that may be made by melt processing methods and having diesel resistant properties The composition may be useful in many applications such as for rotational molding, slush molding, injection molding, extrusion or compression molding, or thermoforming or calendering for making articles that are resistant to diesel fuel, for the automotive market, for example.

BACKGROUND

U.S. Pat. Publ. No. 2010/0056721 assigned to Kraton Polymers discloses a pentablock copolymer having a polyethylene end block, a styrene block polymer, a butadiene block polymer, a styrene block polymer and a polyethylene end block (PE-S-B-S-PE). This polymer is suitable for roto molding. The composition has high melt flow rate (MFR) and the block copolymer is not resistant to diesel fuel.

EP Pat. No. 1,474,458 assigned to Kraton Polymer discloses a styrene—styrene/butadiene—styrene (S-S/B-S) controlled distribution midblock polymer. For the purpose of defining "controlled distribution", this patent is incorporated herein by reference.

A slush moldable composition is disclosed in U.S. Pat. Pub. No. 2012/0070665 assigned to Kraton Polymers. The block copolymer disclosed therein is preferably a triblock copolymer of styrene—styrene/ethylene butadiene—styrene (S-S/EB-S), wherein the midblock component EB is hydrogenated butadiene. The midblock is a controlled distribution of styrene and butadiene that are copolymerized, and then hydrogenated in a manner that primarily affects the butadiene. This block copolymer is not resistant to diesel fuel.

There is a need for a block copolymer composition that is diesel fuel resistant, and can be made by any melt processing technique such as injection molding, extrusion, rotational molding or slush molding, calendaring, or thermoforming techniques for the consumer applications such as, but not limited to, the automotive industry.

SUMMARY OF THE INVENTION

The component compositions provided herein are diesel fuel resistant. The main component of the composition is primarily a triblock copolymer C-A/B-C or (C-A/B)nX where C represents a confined crystalline or semi crystalline polyolefin, hydrogenated low-vinyl polybutadiene end blocks with a controlled distribution midblock AB wherein A represents polyalkenyl arene and B represents hydrogenated diene. The midblock component of polyalkenyl arene can be styrene, alpha methylstyrene, o-methylstyrene, p-methylstyrene, vinyl toluene, vinyl naphthalene, para-butyl styrene, or a mixture of 2 or more of these. The hydrogenated diene component of the midblock may be hydrogenated butadiene, hydrogenated isoprene, or a mixture thereof. The block copolymer may be produced by sequential polymerization, or by branching or coupling via anionic polymerization methods, as is known in the art. The composition also includes a second component of homopolymer or copolymer of butene. The third component of the composition is a homopolymer or copolymer of olefin, which is separate from the C end blocks of the triblock copolymer. The homopolymer or copolymer of olefin can be LDPE, LLDPE, HDPE, homo PP, many polypropylene copolymers (such as ethylene-propylene, propylene-octene, propylene butene, etc) or a mixture of two or more of these. These three components of the composition: the triblock copolymer, the homopolymer or copolymer of butene, and the homopolymer or copolymer of olefin generally comprise about 93 to 99 wt. % of the total composition. Other components comprise the remaining 1 to 7 wt. % such that the total weight of the composition is 100 wt. %.

The composition may be useful for rotational molding, slush molding, injection molding, extrusion or compression molding, or thermoforming or calendering for making articles that are resistant to diesel fuel. Thus, a process of making an article may include mixing the components of the block copolymer to form a uniform mixture of the composition, introducing an amount of the composition into the melt process to form a final article or component of an article. The uniform mixture of the composition may be in the form of a pellet or a powder prior to being subjected to the melt process.

In the broadest sense, the present disclosure provides a composition for producing an article by rotational molding or slush molding or injection molding or extrusion or compression molding or thermoforming or calendering, comprising:
  i) from about 50 to about 70 wt. % block copolymer;
  ii) from about 15 to about 25 wt. % of at least one homopolymer or copolymer of butene;
  iii) from about 12 to about 24 wt. % of at least one polyolefin homopolymer or polyolefin copolymer; and
  iv) about 0.3 to about 3 wt. % of at least one stabilizer;
  v) wherein said block copolymer has hydrogenated low vinyl butadiene endblocks with a specific gravity>0.85 g/cc, and has a controlled distribution midblock of polyalkenyl arene/hydrogenated diene and wherein said total wt. of the composition equals 100 wt. %.

In the broadest sense, the present disclosure is also directed to a process for making an article, comprising:
  i) rotational molding or slush molding or injection molding or extrusion or compression molding or thermoforming or calendering an article from a composition comprising from about 50 to about 70 wt. % block copolymer;
  ii) from about 15 to about 25 wt. % of at least one homopolymer or copolymer of butene;
  iii) from about 12 to about 24 wt. % of at least one polyolefin homopolymer or copolymer; and
  iv) about 0.3 to about 3 wt. % of at least one stabilizer,
  v) wherein said block copolymer has hydrogenated low-vinyl polybutadiene end blocks with a specific gravity>0.85 g/cc, and has a controlled distribution midblock of polyalkenyl arene/hydrogenated diene and wherein said total wt. of the composition equals 100 wt. %, and the composition is melt mixed and extruded and cooled in pellet, micropellet, or ground powder form, prior to said step of rotational molding or slush molding or injection molding or extrusion or compression molding or thermoforming or calendering.

Finally, the copolymers presented herein may be compounded with other optional components not adversely affecting the copolymer properties. Exemplary materials that may be used as additional components may include, without limitation, pigments, antioxidants, colorants surfactants, waxes, and flow promoters. Dusting agents may also be added to the uniform composition in pellet or powder form. The polymers may be useful in a wide variety of applications including, for example, molded and extruded goods.

DETAILED DESCRIPTION OF THE INVENTION

The present disclosure relates to a composition comprising a block copolymer, a homopolymer or copolymer of butene, and polyolefin (homopolymer or copolymer). Optionally primary or primary and secondary stabilizer may be incorporated into the composition. The block copolymer may be formed sequentially or by coupling. Although the block copolymer has a preferred sequential or coupled linear structure as a triblock copolymer, it is contemplated that it may be a branched or a radial coupled copolymer that has at least three arms or more. The block copolymer is formed by anionic polymerization.

With regard to the process to prepare the polymers, the anionic polymerization process includes polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms, make particularly suitable solvents. Frequently used are cyclic alkanes, such as cyclopentane, cyclohexane, cycloheptane, and cyclooctane, all of which are relatively non-polar. Other suitable solvents may be selected to perform effectively in a given set of process conditions, with polymerization temperature being one of the major factors taken into consideration.

The lithium initiator include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator may be used in the polymerization mixture (including monomers and solvent) in an amount calculated on the basis of one initiator molecule per desired polymer chain. The lithium initiator process is described in, for example, U.S. Pat. Nos. 4,039,593 and Re. 27,145, which descriptions are incorporated herein by reference.

Polymerization conditions to prepare the block copolymers described herein are typically similar to those used for anionic polymerizations in general. Polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably nitrogen, and may also be accomplished under pressure within the range of from about 0.5 to about 10 bars. This copolymerization generally requires less than about 12 hours, and may be accomplished in from about 5 minutes to about 5 hours, depending upon the temperature, the concentration of the monomer components, and the molecular weight of the polymer that is desired.

Another important aspect is to control the microstructure or vinyl content of the conjugated diene in the low vinyl polybutadiene end blocks and in the controlled distribution middle block. This is because the low vinyl blocks have a tendency to crystallize thereby imparting solvent resistant characteristics, among other characteristics, typical of semi-crystalline thermoplastics. On the other hand, elevated vinyl contents are desired in the rubbery blocks since the pendant vinyl groups tend to disrupt crystallinity thereby preserving the rubbery character of these blocks. The term 'vinyl' has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C=C moiety pendant to the polymer backbone. The effects of 3,4-addition polymerization of isoprene on the final properties of the block copolymer will be similar to those from 1,2-addition of butadiene. In general, when referring to the use of conjugated diene monomers, the preferred vinyl content is about 5 to 80 mol percent of the condensed conjugated diene units as determined by proton NMR analysis.

The vinyl content (mode of addition of the conjugated diene) is effectively controlled by choice of the polymerization solvent type, polymerization temperature, and presence of microstructure modifier. Both non-chelating and chelating polar compounds, useful as microstructure modifiers, may be used.

Examples of non-chelating microstructure modifiers are dimethyl ether, diethyl ether, ethyl methyl ether, ethyl propyl ether, dioxane, dibenzyl ether, diphenyl ether, dimethyl sulfide, diethyl sulfide, tetramethylene oxide (tetrahydrofuran), tripropyl amine, tributyl amine, trimethyl amine, triethyl amine, pyridine and quinoline and mixtures thereof.

The term "chelating ether" as used herein refers to an ether having more than one oxygen as exemplified by the formula $R(OR')_m(OR'')_o OR$ where each R is individually selected from 1 to 8, preferably 2 to 3, carbon atom alkyl radicals; R' and R'' are individually selected from 1 to 6, preferably 2 to 3, carbon atom alkylene radicals; and m and o are independently selected integers of 1-3, preferably 1-2. Examples of preferred ethers include diethoxypropane, 1,2-dioxyethane (dioxo) and 1,2-dimethyoxyethane (glyme). Other suitable materials include $CH_3$ $OCH_2$, $CH_2$ $OCH_2$, $CH_2$ $OCH_3$ ($C_6H_{14}O_3$-diglyme) and $CH_3CH_2$, $OCH_2$, $CH_2$, $OCH_2CH_2$ and $OCH_2$ $CH_3$. "Chelating amine" means an amine having more than one nitrogen such as N,N,N',N'-tetramethylethylene diamine.

The amount of polar microstructure modifier is controlled in order to obtain the desired vinyl content in the conjugated diene block. Suitable ratios of microstructure modifier to lithium polymer chain end are disclosed in U.S. Pat. No. Re. 27,145. The polar modifier may be used in an amount of at least 0.1 moles per mole of lithium compound, preferably 1-50, more preferably 2-25, moles of promoter per mole of the lithium compound. Alternatively, the concentration can be expressed in parts per million by weight based on the total weight of solvent and monomer. Based on this criteria from 10 parts per million to about 1 weight percent, preferably 100 parts per million to 2000 parts per million are used. This can vary widely, however, since extremely small amounts of some of the preferred modifiers are very effective. At the other extreme, particularly with less effective modifiers, the modifier itself can be the solvent. These techniques are disclosed for instance in Winkler, U.S. Pat. No. 3,686,366 (Aug. 22, 1972), Winkler, U.S. Pat. No. 3,700,748 (Oct. 24, 1972) and Koppes et al., U.S. Pat. No. 5,194,535 (Mar. 16, 1993), the disclosures of which are hereby incorporated by reference.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents may be selected to perform effectively in a given set of process conditions, with temperature being one of the major factors taken into consideration.

Preparation of radial (branched) polymers $(C-A/B)_nX$ requires a post-polymerization step called "coupling". In the above radial formula for the selectively hydrogenated block copolymer, "C" is a hydrogenated low-vinyl polybutadiene block, "A" is polyalkenyl arene block polymer, "B" is hydrogenated diene block polymer, "n" is an integer of from 2 to about 15, preferably from about 2 to about 6, and "X" is the remnant or residue of a coupling agent. A variety of coupling agents may include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985, 830; 4,391,949; and 4,444,953; Canadian Pat. No. 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is of critical importance in the synthesis of block copolymers, which copolymers are prepared by a linking technology. The very high coupling efficiency is the key to making high strength, coupled block copolymers such as those presented herein.

In a preferred embodiment, the block copolymer has three distinct regions, namely C end blocks, separated by a controlled distribution midblock of a copolymer of A and B, in which B rich regions are on the end of the midblock and a polyalkenyl arene rich region are near the middle or center of the midblock. The polyalkyl arene in the block copolymer is present from about 5 to about 40 wt. %. Typically the region adjacent to the C end blocks comprises about the first 15 to 25 wt. % (and all points in-between) of the midblock and comprises the B—diene rich region(s), with the remainder of the midblock considered to be the A—polyalkenyl arene rich region. The term "diene rich" means that the region has a measurably higher ratio of diene to arene than the arene rich region, and vice versa. What is desired is a midblock of polyalkenyl arene/conjugated hydrogenated diene controlled distribution block copolymer, wherein the proportion of polyalkenyl arene units increases gradually to a maximum near the middle or center of the midblock (when describing a triblock structure) and then decreases gradually until the polymer midblock is once again a diene rich region and is fully polymerized. This structure is distinct and different from the tapered and/or random structures discussed in the prior art.

The controlled distribution block copolymer presented is described by Bening, et al. in U.S. Pat. No. 7,169,848 which is incorporated herein by reference. The controlled distribution block copolymer of Bening contains polyalkenyl arene end blocks, and a unique mid-block of a polyalkenyl arene and a conjugated diene. Surprisingly, the combination of (1) a unique control for the monomer addition and (2) the use of diethyl ether or other modifiers as a component of the solvent (which will be referred to as "distribution agents") results in a certain characteristic distribution of the two monomers (herein termed a "controlled distribution" polymerization, i.e., a polymerization resulting in a "controlled distribution" structure), and also results in the presence of a certain polyalkenyl arene rich region and certain conjugated diene rich regions in the polymer midblock. The term "controlled distribution" as used herein is defined as referring to a molecular structure having the following attributes: (1) low vinyl semicrystalline polyolefin "C" end blocks, terminal regions adjacent to the low vinyl semicrystalline polyolefin end blocks that are rich in (i.e., have a greater than average amount of) hydrogenated conjugated diene units—B units; (2) one or more regions not adjacent to the low vinyl semicrystalline polyolefin C end blocks that are rich in (i.e., have a greater than average amount of) poly-alkenyl arene units—A units; and (3) an overall structure having relatively low blockiness. For the purposes hereof, "rich in" is defined as greater than the average amount, preferably greater than 5 wt. % above the average amount. This relatively low blockiness can be shown by either the presence of only a single ("Tg,") intermediate between the Tg's of either monomer alone, when analyzed using differential scanning calorimetry ("DSC") (thermal) methods or via mechanical methods, or as shown via proton nuclear magnetic resonance ("H-NMR") methods. The potential for blockiness can also be inferred from measurement of the UV-visible absorbance in a wavelength range suitable for the detection of polystyryllithium end groups during the polymerization of the midblock. A sharp and substantial increase in this value is indicative of a substantial increase in polystyryllithium chain ends. In this process, this will only occur if the conjugated diene concentration drops below the critical level to maintain controlled distribution polymerization. Any styrene monomer that is present at this point will add in a blocky fashion. The term "styrene blockiness", as measured by those skilled in the art using proton NMR, is defined to be the proportion of S units in the polymer having two S nearest neighbors on the polymer chain. The styrene blockiness is determined after using H-1 NMR to measure two experimental quantities as follows.

First, the total number of styrene units (i.e. arbitrary instrument units which cancel out when ratioed) is determined by integrating the total styrene aromatic signal in the H-1 NMR spectrum from 7.5 to 6.2 ppm and dividing this quantity by 5 to account for the 5 aromatic hydrogens on each styrene aromatic ring.

Second, the blocky styrene units are determined by integrating that portion of the aromatic signal in the H-1 NMR spectrum from the signal minimum between 6.88 and 6.80 to 6.2 ppm and dividing this quantity by 2 to account for the 2 ortho hydrogens on each blocky styrene aromatic ring. The assignment of this signal to the two ortho hydrogens on the rings of those styrene units which have two styrene nearest neighbors was reported in F. A. Bovey, High Resolution NMR of Macromolecules (Academic Press, New York and London, 1972), Ch. 6.

The styrene blockiness is simply the percentage of blocky styrene to total styrene units: Blocky %=100 times (Blocky Styrene Units/Total Styrene Units).

This controlled distribution structure is very important in managing the strength and Tg of the resulting copolymer, because the controlled distribution structure ensures that there is virtually no phase separation of the two monomers, i.e., in contrast with block copolymers in which the monomers actually remain as separate "microphases", with distinct Tg's, but are actually chemically bonded together. This controlled distribution structure assures that only one Tg is present and that, therefore, the thermal performance of the resulting copolymer is predictable and, in fact, predeterminable. Furthermore, when a copolymer having such a controlled distribution structure is then used as one block in a di-block, tri-block or multi-block copolymer, the relatively higher Tg made possible by means of the presence of an appropriately constituted controlled distribution copolymer region will tend to improve flow and processability. Modification of certain other properties is also achievable.

Starting materials for preparing the novel controlled distribution copolymers of the present invention (C-A/B-C or (C-A/B)$_n$X)include the initial monomers. The low vinyl semicrystalline "C" end block may be selected from the group of low vinyl crystallizable polydienes with a specific gravity>0.85 g/cc. Preferably the C block is hydrogenated low vinyl content polybutadiene. The low vinyl content of the "C" block is the amount of a pendant carbon-carbon double bonds added to the polymer chain in the 1,2- or 3,4-addition mode for butadiene or isoprene, respectively. In the context of the present invention "low vinyl" means less than or equal to 15%. Preferred amounts within this range are 10 to 12%, and more preferably 8 to 9% carbon-carbon double bonds in the 1,2- or 3,4-addition mode for butadiene or isoprene, respectively. In any case, the vinyl content should be an amount sufficient for the C block to phase separate and crystallize from the AB block copolymer. In order to present the favorable characteristics of crystallinity while, at the same time, facilitating the manufacturability of the polymer. The mol. wt. of the "C" block is greater than 1 kg/mol and preferably greater than 3 kg/mol peak MW), but less than 20 kg/mol. "Elevated vinyl", as present in the B blocks, means an amount greater than the "low vinyl" amount and is generally achieved through use of a microstructure modifier.

The monoalkenyl arene in the midblock can be selected from styrene, alpha-methylstyrene, para-methylstyrene, ortho-methylstyrene, vinyl toluene, vinylnaphthalene, and para-butyl styrene or mixtures thereof. Of these, styrene is most preferred and is commercially available, and relatively inexpensive, from a variety of manufacturers. The total weight of the midblock comprises 5 to 40 wt. % monoalkenyl arene, such as styrene. As stated previously, these alkenyl arene monomers are then polymerized. The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene". As stated previously these conjugated diene monomers are then polymerized. After polymerization, the conjugated dienes in the midblock are hydrogenated. When butadiene is hydrogenated, it is referred to as ethylene butene. The hydrogenated conjugated dienes in the midblock comprises 60 to 95 wt. % of the total wt. of the midblock.

Hydrogenation can be carried out via any of the several hydrogenation or selective hydrogenation processes known in the prior art. For example, such hydrogenation has been accomplished using methods such as those disclosed in, for example, U.S. Pat. Nos. 3,595,942; 3,634,549; 3,670,054; 3,700,633; and Re. 27,145, the disclosures of which are incorporated herein by reference. These methods operate to hydrogenate polymers containing aromatic or ethylenic unsaturation and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

The block copolymer is selectively hydrogenated and the selective hydrogenation process converts the unsaturated diene double bonds in the C end blocks and the AB controlled distribution midblock. The polymonoalkenyl arene units are not hydrogenated during the selective hydrogenation process. Selective hydrogenation can be carried out via any of the several hydrogenation or selective hydrogenation processes. For example, such hydrogenation has been accomplished using methods such as those described in, for example, U.S. Pat. Nos. 3,494,942; 3,634,594; 3,670,054; 3,700,633; and Re. 27,145. Hydrogenation may be carried out under such conditions that at least about 90 percent of the conjugated diene double bonds have been reduced, and between zero and 10 percent of the arene double bonds have been reduced. Preferred ranges are at least about 95 percent of the conjugated diene double bonds are reduced, and more preferably about 98 percent of the conjugated diene double bonds are reduced.

The block copolymer has a melt flow rate of 1 to 100 g/10 min. at 230° C. and 2.16 kg mass, preferably 1 to 50 g/10 min., and more preferably 1 to 40 g/10 min. The melt flow rate was conducted according to ASTM D 1238.

In the composition described herein, the block copolymer comprises from about 50 to about 70 wt. % of the composition. The composition also comprises 15 to 25 wt. % of a homopolymer or copolymer of butene based on the total wt. % of the composition. The third major component of the composition includes 12 to 24 wt. % of at least one polyolefin homopolymer or copolymer (not a part of the block copolymer) based on the total wt. % of the composition. The melt flow rate of the composition is preferably 5 to 400 g/10 min. at 230° C. and 2.16 kg mass, and preferably 5 to 300 g/10 min. The melt flow rate was conducted according to ASTM D-1238.

The second component of homopolymer of butene ("PB homopolymer") or a copolymer of butene ("PB copolymer") may contain a minor amount of another α-olefin having 2 to 20 carbon atoms or a combination thereof. Preferably, the second component is a combination of the homopolymer and the copolymer (which definition includes terpolymers). The second component can be present in an amount of from about 15-25 weight percent, more preferably in an amount of from 18 to 23 weight percent. In case of the combination of the homopolymer and the copolymer, the weight to weight ratio of the homopolymer to the copolymer is preferably from about 1:1 to about 10:1, more preferably from about 2:1 to about 3:1.

The melt flow rate (MFR(E): ASTM D 1238) of the PB homopolymer or copolymer is suitably in the range of about 0.1 to 500 g/10 min., preferably from about 0.5 to 250 g/10 min. and more preferably about 200 g/10 min., measured at 190 DEG C employing a 2.16 kg weight. A suitable PB homopolymer is Polybutene-1 grade PB0800M, a semi-crystalline homopolymer, from LyondellBasell.

Considering the butene copolymer, the ratio of another α-olefin to be copolymerized is 20 mole % or less, preferably 10 mole % or less and particularly preferably 5 mole % or less. Examples of another α-olefin to be copolymerized include ethylene, propylene, hexene, 4-methylpentene-1, octene-1, decene-1, octadecene-1, etc. A preferred PB copolymer is the plastomer sold under the trademark Koattro, grade KT AR03 or KT AR05 (by LyondellBasell). This copolymer has a density (according to ISO 1183) of about 890 kg/m$^3$, a melting temperature (measured by DSC) of about 114° C., and a MFR(E) (190° C./2.16 kg) of about 0.8 g/10 min.

The third component of polyolefin homopolymer or copolymer include, but are not limited to, polypropylene, high density polyethylene, medium density polyethylene, low density polyethylene, linear low density polyethylene, polyethylene-propylene copolymers, polyethylene-octene copolymers, polyethylene-butene copolymers, and mixtures thereof.

Stabilizers known in the art may also be incorporated into the composition. The stabilizers are for protection during the life of the finished product against, for example, oxygen, ozone and ultra-violet radiation. These may also be for stabilization against thermo-oxidative degradation during elevated temperature processing. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than 1 phr.

Also, optional additives may be blended into the compositions presented herein. Primary antioxidants, secondary antioxidants, and carbon radical scavengers are generally desired components in the present invention, but are not mandatory. Most antioxidants fall into the category of primary or secondary antioxidants and have different functions due to different chemical structures. A primary antioxidant is typically a hindered phenol or arylamines. Primary antioxidants scavenge alkoxy radicals and peroxy radicals. Many primary antioxidants that are compatible with styrenic block copolymers may be incorporated into the compositions of the present invention. Primary antioxidants sold under the trade name, Irganox from BASF may be suitable, such as 1010, 1076, and 1330.

Secondary antioxidants may also be used along with the primary antioxidants. Secondary antioxidants are typically phosphites and thiosynergists. Secondary antioxidants scavenge hydroperoxides which are generated during the autoxidation cycle of a polymer exposed to heat and oxygen. Compositions sold under the trade name, Irgafos® which represents high-performance organo-phosphite stabilizers, may be suitable and are likewise manufactured by BASF. For example, Irgafos 168®, a hydrolytically stable phosphite processing stabilizer, and the like may be suitable.

Carbon radical scavengers are considered to be a third category of antioxidant. Additionally, carbon radical scavengers for example, under the tradename Sumilizer, produced by Sumitomo Chemical may be used. Sumilizer GS is used in the examples below.

Suitable fillers may also be incorporated into the composition hereof when optical clarity is not required for the final end use application. Examples of suitable fillers include, but are not limited to, talc, calcium carbonate, carbon black, fly ash, slate dust, limestone, dolomite and siliceous fillers, such as clay, mica and other sheet silicates. Mixtures of different fillers may be used. Preferably, calcium carbonate or talc may be used as fillers. The amount of filler is preferably from 0% by weight to suitably less than 8% by weight based on total weight of the block copolymer composition and filler.

The polymer blends presented herein may be compounded further with other polymers, oils, fillers, reinforcements, antioxidants, fire retardants, antiblocking agents, lubricants and other rubber and plastic compounding ingredients without departing from the scope of this invention. Dusting agents may also be used to minimize the pellets and/or powder of the polymer blends from agglomerating during storage or transport.

As used herein, diesel fuel resistance refers to minimal gloss change after 1 minute exposure and no texture change or color transfer to the wipe also after 1 minute exposure. The wipe used is a standard laboratory Kimwipe.

EXAMPLE 1

Preparation of Compositions 1 Through 4

Compositions 1 through 4 were prepared from the ingredients set forth in Table 1. The styrenic block copolymer of Compositions 1, 2, and 4 were replaced with the block copolymer comprising hydrogenated low-vinyl polybutadiene end blocks with a specific gravity>0.85 g/cc. Compositions 1 and 2 included either an aromatic or aliphatic thermoplastic polyurethane as polyurethane is frequently used in applications requiring good oil, fuel, and chemical resistance. Compositions 1 and 2 incorporated a functionally modified S-S/EB-S into the composition to improve compatibility between the styrenic block copolymer and the thermoplastic polyurethane. Compositions 1 and 2 incorporated either LDPE or HDPE as an additional ingredient. All compositions had primary and secondary stabilizer in the same amounts. Cabot Plaback is an inert pigment. Polymer A is MD 6951, a selectively hydrogenated, controlled distribution styrenic block copolymer with a 35 wt. % polystyrene content and a melt flow rate of about 48 g/10 min. @ 230° C. and 2.16 kg. Polymer A has glassy styrene endblocks and an elevated vinyl content rubbery block having no significant crystallinity. Polymer B is a C-S/EB-C triblock having semi-crystalline, low vinyl endblocks and an elevated vinyl content, rubbery block having no significant crystallinity.

TABLE 1

| COMPOUND | GRADE | Comp. 1 | Comp. 2 | Comp. 3 | Comp. 4 |
|---|---|---|---|---|---|
| Polymer A | S-S/EB-S | 15 | 15 | | 61 |
| Polymer B (EDF 10192) | C-S/EB-C (2.26 g/10 min. @ 230° C./2.16 kg) | | | 61 | |
| Estane 58300 | Aromatic TPU, ether based | | 41 | | |
| Estane ALR E77A | Aliphatic TPU, ether based | 41 | | | |
| Fusabond E 100 | HDPE MA modified | 5 | 5 | | |
| RP 6670 | MA-S-EB/S-S | 15 | 15 | | |
| PB 800 | PB-1 | 15 | 15 | 20 | 20 |
| Marlux HMW TR945 | HDPE Roto-molding grade | 18 | | 18 | 18 |
| Dow LDPE 450E/608/690HT | LDPE | | 18 | | |
| Irgafos 168 | Prim Stab | 0.7 | 0.7 | 0.7 | 0.7 |
| Ethanox 330 | Sec Stab | 0.3 | 0.3 | 0.3 | 0.3 |
| Total | | 100 | 100 | 100 | 100 |
| Cabot Plablack | | 1.5 | 1.5 | 1.5 | 1.5 |

EXAMPLE 2

Preparation and Testing of Compositions

In Table 2 Compositions 5 and 6 are disclosed. For Composition 5, Polymer EDF 9975 (C-S/EB-C) is a triblock copolymer having low vinyl, semi-crystalline endblocks and an elevated vinyl, rubber midblock and had a melt flow rate of 11.5 g/10 min. @ 230° C. under 2.16 kg mass. For Composition 6, Polymer EDF 9938 (C-S/EB-C) is a triblock copolymer having low vinyl, semi-crystalline endblocks and an elevated vinyl, rubber midblock and had a melt flow rate of 17 g/10 min. @ 230° C. under 2.16 kg mass. The test results of several properties for Composition 3, Composition 5, and Composition 6, along with the Compositions 1, 2, and 4 are set forth in Table 3.

TABLE 2

| | Composition 5 | | | | Composition 6 | | |
|---|---|---|---|---|---|---|---|
| Formulation Ingredient | Parts | % | grams | Formulation Ingredient | Parts | % | grams |
| EDF 9975 | 61.0 | 60.1 | 180.30 | EDF 9938 | 61.0 | 60.1 | 180.3 |
| PB800 | 20.0 | 19.7 | 59.11 | PB800 | 20.0 | 19.7 | 59.1 |
| Marlux HMW TR945 | 18.0 | 17.7 | 53.2 | Marlux HMW TR945 | 18.0 | 17.7 | 53.2 |
| Irgafos 168 | 0.7 | 0.7 | 2.07 | Irgafos 168 | 0.70 | 0.69 | 2.07 |
| Ethanox 330 | 0.3 | 0.3 | 0.89 | Ethanox 330 | 0.30 | 0.30 | 0.89 |
| Cabot Black | 1.5 | 1.5 | 4.43 | Cabot Black | 1.50 | 1.48 | 4.43 |
| | 101.5 | 100.0 | 300.00 | | 101.5 | 100.00 | 300.00 |

TABLE 3

| | | | Comp. 1 | Comp. 2 | Comp. 3 | Comp. 4 | Comp. 5 | Comp. 6 |
|---|---|---|---|---|---|---|---|---|
| Composition Melt Flow, 230° C. @ 2.16 kg | | | n.m | n.m | 9 | 61 | 22 | 17 |
| Hardness, Shore A | | | n.m | n.m | 82 | 60 | 88 | 82 |
| Tensile, compression molded plaque, mini D die | | | n.m | n.m | | | | |
| Tensile Strength | psi | AVG | n.m | n.m | 2513 | 2724 | 1350 | 1820 |
| | | STD | n.m | n.m | 204 | 101 | 70 | 49 |
| Elongation | % | AVG | n.m | n.m | 707 | 732 | 615 | 688 |
| | | STD | n.m | n.m | 58 | 22 | 55 | 30 |
| Modulus 100% | psi | AVG | n.m | n.m | 801 | 434 | 985 | 943 |
| | | STD | n.m | n.m | 9 | 7 | 24 | 17 |
| Modulus 300% | psi | AVG | n.m | n.m | 1218 | 1044 | 1111 | 1337 |
| | | STD | n.m | n.m | 7 | 12 | 42 | 25 |
| Modulus 500% | psi | AVG | n.m | n.m | 1808 | 1695 | 1249 | 1818 |
| | | STD | n.m | n.m | 21 | 41 | 68 | 49 |
| Diesel Fuel Spot Test | Gloss Loss | | Yes | Yes | Slight | Yes | No | No |
| | Texture Change | | No | Yes | No | Yes | No | No |
| (1 min. exposure before) | Color Transfer | | No | Yes | No | Yes | No | No |

Table 3 shows test data of Shore A Hardness (per ASTM D2240) as well as Diesel fuel spot tests and an 24 hour diesel immersion test. In Table 3 some compositions were further tested for melt flow rate according to ASTM D1238, tensile strength according to ASTM D412 and Elongation and Modulus according to ASTM D412 all using a mini D specimen die.

Note that the Composition 3, Composition 5, and Composition 6 were based on block copolymers with the molecule structure of C-A/B-C or (C-A/B)$_n$X exhibiting a wide range of MFR from 9 to 22 g/10 min. making them suitable for a wide range of melt processing techniques. Composition 3, Composition 5, and Composition 6 all demonstrated good resistance to diesel fuel when subjected to a 1 minute spot test. Composition 3 showed only slight gloss change along with no texture or color transfer to the wipe. Composition 5 and Composition 6 also showed similar good diesel fuel resistance with no gloss change. The diesel fuel resistance of Composition 3, Composition 5, and Composition 6 are all significantly superior to that of Composition 1, Composition 2, and Composition 4 which showed significant gloss change at a minimum and in some cases with texture changes and color transfer to the wipe. Since TPU is typically used in the industry for applications requiring good chemical resistance, the superior performance of Composition 3, Composition 5, and Composition 6 is a significant improvement.

Thus it is apparent that there has been provided a composition and a process for making a soft TPE article that fully satisfies the objects, aims and advantages set forth above. While specific embodiments have been presented herein, it is evident that many alternatives, modifications and variations will be apparent to those skilled in the art in light of the foregoing description. Accordingly, the present disclosure is intended to embrace all such alternatives, modifications and variations as fall within the spirit and broad scope of the appended claims.

What is claimed is:

1. A composition for producing an article by rotational molding or slush molding or injection molding or extrusion or compression molding or thermoforming or calendering, comprising:
    from about 50 to about 70 wt. % block copolymer;
    from about 15 to about 25 wt. % of at least one homopolymer or copolymer of butene; and
    from about 12 to about 24 wt. % of at least one polyolefin homopolymer or polyolefin copolymer;
    wherein said block copolymer has hydrogenated low-vinyl polybutadiene end blocks with a specific gravity>0.85 g/cc, and has a controlled distribution midblock of polyalkenyl arene/hydrogenated diene and wherein said composition total wt. equals 100 wt. %.

2. The composition of claim 1, wherein said block copolymer has the structure of C-A/B-C or (C-A/B)$_n$X wherein C is a hydrogenated, low vinyl, semi-crystalline polybutadiene block, AB is a controlled distribution polymer midblock of monalkenyl arene and butadiene having an elevated vinyl content, X is the residue of a coupling agent and n is from 2 to 6.

3. The composition of claim 1, wherein said polyolefin homopolymer or polyolefin copolymer is polypropylene, high density polyethylene, medium density polyethylene, low density polyethylene, linear low density polyethylene, polyethylene copolymers, polypropylene copolymers, polybutene copolymers, or a mixture of 2 or more of these.

4. The composition of claim 1, wherein said polyalkenyl arene is selected from the group of styrene, alpha methylstyrene, o-methylstyrene, p-methylstyrene, vinyl toluene, vinyl naphthalene, para-butyl styrene, or a mixture of 2 or more of these.

5. The composition of claim 4, wherein said hydrogenated diene is selected from the group of hydrogenated butadiene, hydrogenated isoprene or a mixture of these.

6. The composition of claim 4, wherein said block copolymer is C-S/EB-C, where C is hydrogenated, low vinyl, semi-crystalline polybutadiene, and S/EB is a controlled distribution polymer midblock of styrene and hydrogenated butadiene.

7. The composition of claim 1, further including about 0.3 to about 3 wt. % of at least one stabilizer.

8. The composition of claim 6, wherein said block copolymer has a melt flow index of about 1 to about 50 g/10 min. at 230° C., with a wt. of 2.16 kg.

9. The composition of claim 1, wherein said composition has a melt flow rate range of 5 to 400 g/10 min. at 230° C. and 2.16 kg.

10. A process for making an article, comprising:
    rotational molding, injection molding, extrusion, calendaring, thermoforming, or slush molding an article from a composition, comprising:
    from about 50 to about 70 wt. % block copolymer;
    from about 15 to about 25 wt. % of at least one homopolymer or copolymer of butene; and
    from about 12 to about 24 wt. % of at least one polyolefin homopolymer or copolymer ;
    wherein said block copolymer has hydrogenated low-vinyl polybutadiene end blocks with a specific gravity>0.85 g/cc, and has a controlled distribution midblock of polyalkenyl arene/hydrogenated diene and wherein said composition total wt. equals 100 wt. % and the composition is melt mixed prior to said step of rotational molding or slush molding or injection molding or extrusion or calendaring.

11. A process for making an article of claim 10, wherein said polyolefin homopolymer or polyolefin copolymer is polypropylene, high density polyethylene, medium density polyethylene, low density polyethylene, linear low density polyethylene, polyethylene copolymers, polypropylene copolymers, polybutene copolymers, or a mixture of 2 or more of these.

12. The process for making an article according to claim 10, wherein said polyalkenyl arene is selected from the group of styrene, alpha methylstyrene, o-methylstyrene, p-methylstyrene, vinyl toluene, vinyl naphthalene, para-butyl styrene, or a mixture of 2 or more of these.

13. The process for making an article according to claim 10, wherein said hydrogenated diene is selected from the group of hydrogenated butadiene, hydrogenated isoprene or a mixture of these.

14. A process for coating a fabric, foam, or rigid sheet substrate with a composition, comprising:
    coating a fabric, foam, or rigid sheet substrate by extrusion or calendering to make an article, said composition comprising:
    from about 50 to about 70 wt. % block copolymer;
    from about 15 to about 25 wt. % of at least one homopolymer or copolymer of butene;
    from about 12 to about 24 wt. % of at least one polyolefin homopolymer or copolymer;
    wherein said block copolymer has hydrogenated low-vinyl polybutadiene end blocks with a specific gravity>0.85 g/cc, and has a controlled distribution midblock of polyalkenyl arene/hydrogenated diene and wherein said composition total wt. equals 100 wt. % and the composition is melt mixed, prior to said step of coating a fabric, foam, or rigid sheet substrate.

15. A process for coating a fabric, foam, or rigid sheet substrate according to claim 14, wherein said polyolefin homopolymer or polyolefin copolymer is polypropylene, high density polyethylene, medium density polyethylene, low density polyethylene, linear low density polyethylene, polyethylene copolymers, polypropylene copolymers, polybutene copolymers, or a mixture of 2 or more of these.

16. A process for coating a fabric, foam, or rigid sheet substrate according to claim 15, wherein said polyalkenyl arene is selected from the group of styrene, alpha methylstyrene, o-methylstyrene, p-methylstyrene, vinyl toluene, vinyl naphthalene, para-butyl styrene, or a mixture of 2 or more of these.

17. A process for coating a fabric, foam, or rigid sheet substrate according to claim 15, wherein said hydrogenated diene is selected from hydrogenated butadiene, hydrogenated isoprene or a mixture of these.

18. A process for making a molded article by injection molding, extrusion, thermoforming, rotational molding, or slush molding with a composition comprising:
from about 50 to about 70 wt. % block copolymer;
from about 15 to about 25 wt. % of at least one homopolymer or copolymer of butene;
from about 12 to about 24 wt. % of at least one polyolefin homopolymer or copolymer;
wherein said block copolymer has hydrogenated low-vinyl polybutadiene end blocks with a specific gravity>0.85 g/cc, and has a controlled distribution mid-block of polyalkenyl arene/hydrogenated diene and wherein said composition total wt. equals 100 wt. % and the composition is melt mixed, prior to said step of forming the molded article.

19. An article comprising a composition, wherein the composition comprises:
(i) from about 50 to about 70 wt. %, based on the total weight of the composition, of a block copolymer, wherein said block copolymer has two end-blocks and at least one mid-block, wherein the end-blocks are hydrogenated low-vinyl polybutadiene end-blocks having a specific gravity greater than 0.85 g/cc, and the mid-block is a controlled distribution mid-block comprising a polyalkenyl arene and a hydrogenated diene; and
(ii) from about 30 to about 50 wt. %, based on the total weight of the composition, of at least one polyolefin homopolymer, a copolymer of propylene, or a copolymer of butene;
wherein total wt. % of the composition equals 100 wt. %, and wherein the composition has a melt flow rate of about 5 to about 100 g/10 min. measured at 230°C. with a 2.16 kg mass.

* * * * *

UNITED STATES PATENT AND TRADEMARK OFFICE
CERTIFICATE OF CORRECTION

PATENT NO. : 9,862,819 B2
APPLICATION NO. : 15/175396
DATED : January 9, 2018
INVENTOR(S) : Kathryn J. Wright It is certified that error appears in the above-identified patent and that said Letters Patent is hereby corrected as shown below:

On the Title Page

In Abstract, Line 5, delete "gravity>0.85" and insert -- gravity > 0.85 --, therefor.

In the Specification

In Column 2, Line 44, delete "gravity>0.85" and insert -- gravity > 0.85 --, therefor.

In Column 2, Line 61-62, delete "gravity>0.85" and insert -- gravity > 0.85 --, therefor.

In Column 7, Line 37, delete "gravity>0.85" and insert -- gravity > 0.85 --, therefor.

In Column 10, Line 57, delete "gravity>0.85" and insert -- gravity > 0.85 --, therefor.

In the Claims

In Column 13, Line 49-50, delete "gravity>0.85" and insert -- gravity > 0.85 --, therefor.

In Column 14, Line 30-31, delete "gravity>0.85" and insert -- gravity > 0.85 --, therefor.

In Column 14, Line 64-65, delete "gravity>0.85" and insert -- gravity > 0.85 --, therefor.

In Column 15, Line 2-3, delete "gravity>0.85" and insert -- gravity > 0.85 --, therefor.

Signed and Sealed this
Eleventh Day of December, 2018

Andrei Iancu
*Director of the United States Patent and Trademark Office*